United States Patent [19]

Josephson et al.

[11] Patent Number: 4,608,625
[45] Date of Patent: Aug. 26, 1986

[54] CURRENT DRIVEN FLYBACK POWER SUPPLY

[75] Inventors: Elliot Josephson, Los Altos; Frederick S. Parker, Ben Lomand, both of Calif.

[73] Assignee: Astec Components, Ltd., Santa Clara, Calif.

[21] Appl. No.: 489,263

[22] Filed: Apr. 27, 1983

[51] Int. Cl.⁴ .......................................... H02M 3/335
[52] U.S. Cl. ..................................... 363/21; 363/80; 363/97
[58] Field of Search ...................... 363/18, 19, 20, 21, 363/79, 80, 97, 131

[56] References Cited

U.S. PATENT DOCUMENTS

| | | | |
|---|---|---|---|
| 4,092,709 | 5/1978 | Voigt et al. | 363/18 |
| 4,135,234 | 1/1979 | Forge | 363/21 |
| 4,321,507 | 3/1982 | Bosnak | 363/19 |
| 4,323,961 | 4/1982 | Josephson | 363/56 |
| 4,347,559 | 8/1982 | Sturgeon | 363/21 |
| 4,361,865 | 11/1982 | Shono | 363/19 |
| 4,378,585 | 3/1983 | Bete | 363/19 |
| 4,453,206 | 6/1984 | Voight | 363/97 |

FOREIGN PATENT DOCUMENTS

| | | | |
|---|---|---|---|
| 2041341 | 2/1972 | Fed. Rep. of Germany . | |
| 2725531 | 12/1977 | Fed. Rep. of Germany . | |
| 1456383 | 11/1976 | United Kingdom | 363/21 |
| 2091457 | 8/1982 | United Kingdom | 363/19 |

OTHER PUBLICATIONS

"Flyback Converters With Current Transformer Drive", J. R. Kinghorn; *Mullard Technical Communications*; vol. 13, pp. 210–224, No. 125, Jan. 1975.
Flyback Converters: "Solid State Solution To Low Cost Switching Power Supplies"; *Electronics*, Dec. 21, 1978; Boschert.

*Primary Examiner*—William H. Beha, Jr.
*Assistant Examiner*—Jeffrey Sterrett
*Attorney, Agent, or Firm*—Fitch, Even, Tabin & Flannery

[57] ABSTRACT

A current driven flyback power supply has a transistor current switch which periodically couples a primary current through the primary winding of a power transformer which is connected between a source of DC and the collector of the current switch. A current transformer has a first winding coupled between the primary winding and the collector of the current switch, and a second winding which develops a drive current proportional to the primary current. The drive current is coupled to the base of the current switch and increases proportionally with the increasing amplitude of the primary current. An electrical switch shorts the drive current to ground to turn off the current switch so that stored energy in the power transformer is coupled out through its secondary winding to an output rectifier circuit which develops the output DC voltage. After the stored energy has been completely coupled out through the secondary winding, a first current pulse is developed to turn on the current switch to initiate the primary current. During high output power loading conditions, a second current pulse is developed at a selected point in time after the current switch turns off and prior to the stored energy being completely coupled out through the secondary winding. The second current pulse turns on the current switch whereby the initial primary current is boosted in amplitude by the residual stored energy in the power transformer.

7 Claims, 5 Drawing Figures

FIG. 4

CURRENT DRIVEN FLYBACK POWER SUPPLY

CURRENT DRIVEN FLYBACK POWER SUPPLY

The present invention relates generally to DC power supplies, and more particularly to a current driven, free running flyback power supply.

Known DC flyback power supplies provide one or more regulated output DC voltages from an unregulated DC source. Power from the DC source is transferred first to a power transformer during a drive cycle and secondly to an output rectifier circuit during a flyback cycle, the rectifier circuit providing the output voltage. During the drive cycle, a switch closes, thereby coupling a primary winding of the power transformer in series with the DC source. This develops a current in the primary winding causing energy to be stored in the transformer. To start the flyback cycle, the switch is opened. The stored energy is then coupled out through a secondary winding of the power transformer to the rectifier circuit. The switch is usually a transistor switch in series with the primary winding and the DC source. The "on" time of the transistor switch during the drive cycle determines the amount of magnetic energy stored in the power transformer. The switching rate of the transistor switch is controlled through negative feedback of the output voltage to provide output voltage regulation.

With negative feedback of the output voltage, a transformer coupled switching regulator is realized. Normally, the regulator samples the output DC voltage and compares it with a voltage reference, and uses the resultant error voltage signal to control the transistor switch. This error signal is usually applied to the transistor switch through an isolation circuit to maintain isolation between the DC source and output voltage. To properly regulate the output voltage during minimum and maximum load conditions, the transistor switch oscillates so that it has minimum on time during minimum load and maximum on time at maximum load.

During periods of high output load, the free running power supply can also be operated as a clocked power supply. If the stored energy of the power transformer during the flyback cycle has not been fully transferred to the rectifier circuit, and hence to the load, after a predetermined time interval, a timing circuit can initiate turn-on of the transistor switch to begin a new drive cycle. The initial current in the primary winding is boosted by the residual stored energy of the power transformer which is coupled back to the primary winding, thereby increasing the amount of stored energy which may be transferred out of the secondary winding to the rectifier circuit during the next flyback cycle. In an isolated, voltage driven regulator, this timing circuit can be driven from the voltage of a tertiary or feedback winding of the power transformer, which avoids DC coupling between the secondary winding and the switching transistor.

DC isolation between the primary and secondary windings of the power transformer is usually provided when the power supply must meet certain safety standards or performance requirements. For example, high voltage transients and electromagnetic interference (noise) are not coupled through to the secondary winding and output rectifier circuit, or, at least, are substantially minimized when DC isolation is provided.

A power supply for a small, portable computer does not generally need to meet such safety and performance requirements. It is thus desirable to provide DC coupling between the primary and secondary winding sides of the power transformer. Such DC coupling allows simplification in circuit design while providing the plurality of well regulated output voltages required in such a computer, and also minimizing the space occupied by the power supply. In a briefcase size computer designed to have minimal overall dimension, it is especially desirable to reduce the space occupied by the power supply.

It is therefore an object of the present invention to provide a novel current driven DC flyback power supply.

It is another object of the present invention to provide DC coupled feedback regulation between the primary and secondary windings of the power transformer.

It is a further object of the present invention to provide a DC coupled timing circuit between the primary and secondary windings of the power transformer to boost power transfer through the power transformer at high output loads.

These and other objects, advantages and features of the present invention are more particularly set forth and will become more apparent from the accompanying detailed description, the appended claims, and the following drawings in which:

Broadly stated, the present invention is directed to a current driven, free running flyback power supply including a power transformer having a primary winding and a secondary winding, and a current switch. The current switch, when on during a drive cycle of the power supply, causes a primary current from a DC source to be coupled through the primary winding, thereby causing energy to be stored in the power transformer. A current transformer develops a drive current to drive the current switch, the drive current being proportional to the primary current. The current switch, as the primary current constantly increases in amplitude, thereby receives a proportionally increasing drive current to maintain the current switch on. An electrical switch means operates to subsequently divert the drive current from the current switch, to cause it to turn off in response thereto, to regulate the on-time of the current switch and thus the amount of energy stored in the power transformer. When the current switch turns off, a flyback cycle of the power supply begins and stored power in the transformer is transferred to the secondary winding. A rectifier means generates an output voltage from the stored energy transferred to the secondary winding. The present invention also includes two modes of operation for causing the current switch to go on. In a first mode, at lower power demand levels, the stored energy is completely delivered out of the transformer and into the rectifier means, so as to cause the voltage of the secondary winding to change polarity. A current pulse developing means develops a short first current pulse in response to this changed polarity.

This current pulse is applied to the current switch which, in response, turns on to initiate the coupling of the primary current through the primary winding. After the primary current has been initiated, the drive current is maintained by the current transformer to allow the amplitude of the primary current through the current switch to again increase at a constant rate for the rest of the drive cycle.

In the second mode of operation, the present invention includes a timing circuit which triggers the current pulse developing means to develop a short second current pulse at a predetermined time after the start of the flyback cycle. If all of the stored energy has not been transferred out through the secondary winding to the rectifier means at the predetermined time, the second current pulse is applied to the current switch, causing it to turn on, to thereby initiate the coupling of the primary current through the primary winding and start a new drive cycle. Since the flyback cycle was not complete, the primary current is boosted in amplitude by the residual stored energy remaining in the power transformer, whereby the boosted primary current enables an increased amount of energy to be stored in the power transformer during the next drive cycle. This boosted energy is transferred to the rectifier circuit out through the secondary winding during the next successive flyback cycle.

Figure 1:
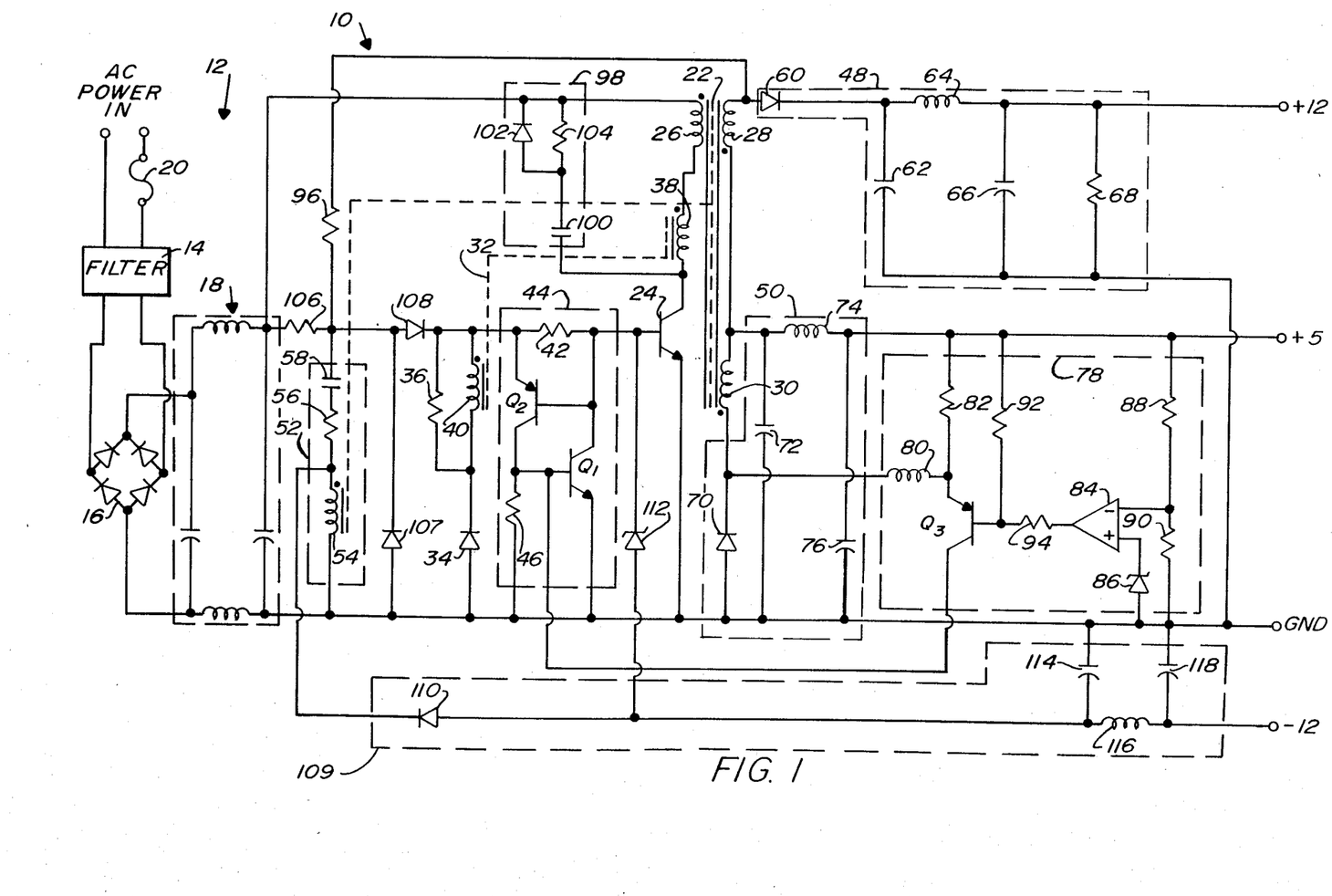
FIG. 1 is a schematic diagram of a current driven free running flyback power supply according to the present invention.

Referring now to FIG. 1, the present invention is described in greater detail with respect to a schematic diagram of a preferred embodiment of a current driven, free running flyback power supply 10. Power supply 10 develops one or more output voltages from a conventional, unregulated DC voltage source 12. In a preferred embodiment, source 12 develops this unregulated DC voltage in a conventional manner from an AC power source by means of a filter 14, a diode bridge 16 and one or more LC filter stages 18. A fuse 20 may also be provided for short circuit protection within power supply 10.

Power supply 10 includes a power transformer 22 and a current switch 24. Power transformer 22 has a primary winding 26 and one or more secondary windings 28 and 30. Primary winding 26 is electrically coupled in series between source 12 and current switch 24. When current switch 24 is on, it causes a primary current to be coupled through primary winding 26 from source 12. The primary current causes energy to be stored in power transformer 22. Current switch 24 is preferably a transistor biased as a switch which functions to couple primary current from primary winding 26 to ground when an appropriate drive current is applied to the base of this transistor.

Power supply 10 further includes means for developing a drive current to drive current switch 24 regeneratively from the primary current. Current switch 24, as the primary current constantly increases in amplitude, receives a drive current which also proportionally increases in amplitude, thereby maintaining current switch 24 on. In the preferred embodiment of power supply 10, the drive current developing means includes a current transformer 32, a diode 34 and a damping resistor 36. Current transformer 32 has a first winding 38 in series with primary winding 26 to sense the primary current and a second winding 40 which regeneratively develops the drive current. Therefore, the drive current generated by second winding 40 is proportional to the primary current. During positive transitions of the primary current, a voltage is induced in first winding 38 which is magnetically coupled to second winding 40. First and second windings 38 and 40 are arranged so that the voltage across second winding 40 during positive transitions of the primary current forward biases diode 34, to complete a drive current loop for the drive current through current switch 24, diode 34 and second winding 40. The drive current is applied to the base of transistor current switch 24 through a resistor 42, as described in greater detail hereinbelow. Damping resistor 36 damps ringing of second winding 40 when diode 34 becomes reversed biased and opens the drive current loop.

Also included in power supply 10 is an electrical switch means 44 for turning off current switch 24. When switch 44 goes on, it provides a path to ground for the drive current. Preferably, switch 44 is connected directly between the base of transistor switch 24 and ground. As described below in greater detail, when current switch 24 turns off, the flyback cycle begins, and energy is transferred out of the power transformer 22 via secondary windings 28 and 30.

Electrical switch means 44 includes a first switching transistor Q1, a second switching transistor Q2, a resistor 46, as well as the above mentioned resistor 42. When transistor Q1 goes on, it saturates to short the drive current and the base of current switch 24 to ground, whereby current switch 24 is turned off. Transistor Q1 is caused to go on in one of two ways. Usually it will go on in response to a feedback pulse, developed as hereinbelow described, from the secondary winding side of power supply 10 which is applied to the base of transistor Q1. It will also go on as a function of transistor Q2 and resistor 42. When the primary current reaches a predetermined maximum, the proportional drive current develops a voltage across resistor 42 sufficient to forward bias the base-emitter junction of transistor Q2 which then turns on. Resistor 46 is a bias resistor for transistor Q1. When transistor Q2 turns on, its collector current develops a voltage across resistor 46 sufficient to allow transistor Q1 to turn on.

Rectifier means 48 and 50 are associated with respective secondary windings 28 and 30. Each rectifier means 48 and 50 develops an output voltage from the stored energy transferred to its associated secondary winding. Rectifier means 48 is of conventional design and includes a diode 60, a capacitor 62 and an output LC filter stage having an inductor 64 and a capacitor 66. Rectifier means 48 also includes a bleeder resistor 68 which bleeds a small amount of stored charge from capacitor 66. Rectifier means 50 is also of conventional design, and includes a diode 70, a capacitor 72, and an output LC filter stage having an inductor 74 and a capacitor 76.

When all the stored energy of secondary winding 28 has been delivered to rectifier means 48, secondary winding 28 will change polarity. A current pulse developing means 52 develops a short current pulse in response to this change of polarity. This current pulse is applied to current switch 24 through resistor 42. Current switch 24 is turned on by this current pulse to initiate the flow of primary current through primary winding 26. Once the primary current is initiated, the drive current generated by current transformer 32 drives current switch 24.

Current pulse developing means 52 includes a tertiary winding 54, a resistor 56 and a capacitor 58. Tertiary winding 54 is a feedback winding of power transformer 22. When the polarity of secondary windings 28, 30 change after their stored energy has been delivered to respective rectifier means 48, 50, tertiary winding 54 changes polarity, causing a positive current to flow through resistor 56, capacitor 58 and resistor 42 into the base of current switch 24. The time constant of resistor 56 and capacitor 58 is selected so that this current quickly charges capacitor 58, and only the short current pulse described above passes through capacitor 58. The time constant of this R-C circuit is preferably on the order of one microsecond.

Power supply 10 also includes pulse-width modulating means 78 for developing a feedback pulse at a time determined by the output voltage developed by rectifier means 50. Electrical switch means 44 responds to this feedback pulse by shorting the drive current and the base of current switch 24 to ground, thereby turning off switch 24. Timing of the feedback pulse provides regulation of the output voltage by controlling the time duration of the drive cycle. In one embodiment of the present invention, the feedback pulse is DC coupled to the electrical switch means at the base of transistor Q1.

Pulse-width modulating means 78 includes a switching transistor Q3, and means for generating a ramp voltage having an inductor 80 and resistor 82. Pulse-width modulating means 78 also includes means for developing an error voltage as a function of the deviance of the output voltage of rectifier means 50 from a desired output voltage, and a voltage averaging circuit formed by resistors 92 and 94. The error voltage developing means includes a comparator 84, a source of reference potential having a zener diode 86, and a voltage divider network formed by resistors 88 and 90.

The error voltage developed by comparator 84 is proportional to the difference between the reference voltage developed by zener diode 86 and the divided output voltage between resistors 88 and 90. The reference voltage of zener diode 86 and the values of resistors 88 and 90 are selected so that when the output voltage of rectifier means 50 is at its desired regulated value, the error voltage goes low. Thus, in an exemplary embodiment of the present invention, with the output of rectifier means 50 set at 5 volts, when resistors 88 and 90 are of equal value, zener diode 86 is selected to provide a reference of 2.5 volts. The error voltage is weighted with the present output voltage through resistors 92 and 94 to provide the base drive voltage for transistor Q3.

When the ramp voltage applied to the emitter of transistor Q3 exceeds the base drive voltage, transistor Q3 turns on, developing the feedback pulse which is applied to the base of transistor Q1 of electronic switch means 44. Electronic switch means 44, in response thereto, shorts the drive current to ground to turn off current switch 24.

Power supply 10 also includes boost circuit means for developing a short, second current pulse at a predetermined time after current switch 24 is switched off. This boost circuit means includes a resistor 96 and capacitor 58. Capacitor 58 has been described above in conjunction with first current pulse generating means 52. When secondary winding 28 is transferring stored power to rectifier means 48 during a flyback interval, a current is developed through resistor 96 which charges capacitor 58. At the predetermined time, which would only be reached during periods of high loading on power supply 10, the voltage on capacitor 58 is sufficient to start turn-on of current switch 24. Current-pulse developing means 52 is triggered at this point to develop a second short current pulse which is applied to current switch 24 through resistor 42. In this boost mode, when current switch 24 turns on and causes the primary current to be coupled through primary winding 26, there is residual stored energy in power transformer 22, which enables the initial primary current in primary winding 26 to start at a boosted level. This boosted primary current increases the stored energy which is transferred to rectifier means 48 and 50 during the next successive flyback cycle.

In parallel with primary winding 26 between source 12 and current switch 24 is a turn-off snubber circuit 98. This circuit is designed to eliminate voltage spikes in the primary current and clamp the maximum voltage at the collector of current switch 24 to a safe voltage. Snubber circuit 98 includes a capacitor 100 in series with a parallel connection of a diode 102 and a resistor 104. When current switch 24 turns off, the primary current, which cannot instantaneously change because of the inductive reactance of primary winding 26, charges capacitor 100 through diode 102. Since capacitor 100 already has an initial charge from being charged from source 12 through resistor 104 when current switch 24 is on, and such voltage cannot instantaneously change, the voltage transient at the collector of current switch 24 when it switches off is slowed by the time duration required to charge capacitor 100. When current switch 24 turns on, capacitor 100 is charged through resistor 104, diode 102 being reverse biased.

To initially start up power supply 10, power supply 10 includes resistor 106 which forms a voltage divider network with resistor 96. At start up, resistor 96 is effectively grounded via the output impedance seen by supply 10. The value of resistor 96 is selected in accordance with the predetermined time constant for the boost circuit means, which is determined by resistor 96 and capacitor 52. Thus, resistor 106 need only be selected so that the divided voltage appearing between resistor 106 and resistor 96 at initial power up (output voltages at 0) is sufficient to turn on current switch 24 to initiate coupling of the primary current through primary winding 26 at a selected turn on threshold voltage of source 12.

Power supply 10 also includes a pair of diodes 107 and 108. Diode 107 clamps the voltage of capacitor 58 to ground potential less the forward bias voltage drop across diode 107. Diode 108 isolates voltage transients of capacitor 58 from the base of current switch 24.

A third rectifier means 109 of power supply 10 may be used to develop a negative output voltage with respect to the ground potential. Third rectifier means 109 includes a diode 110, a zener diode 112, a capacitor 114, and an output LC filter stage having an inductor 116 and capacitor 118. Diode 110 and capacitor 114 rectify and filter, respectively, the voltage of tertiary winding 54 when current switch 24 is switched off. Zener diode 112 regulates the negative output voltage of rectifier means 109 to a maximum negative voltage with reference to the voltage of the base of current switch 24. In a preferred embodiment of power supply 10, rectifier means 109 normally provides a negative 12 volt output. Zener diode 112 is selected to provide a 15 volt reference, the output of rectifier 109 is limited to this voltage reference since current switch 24 will turn off if it's base is pulled below the ground potential.

Figure 2A:
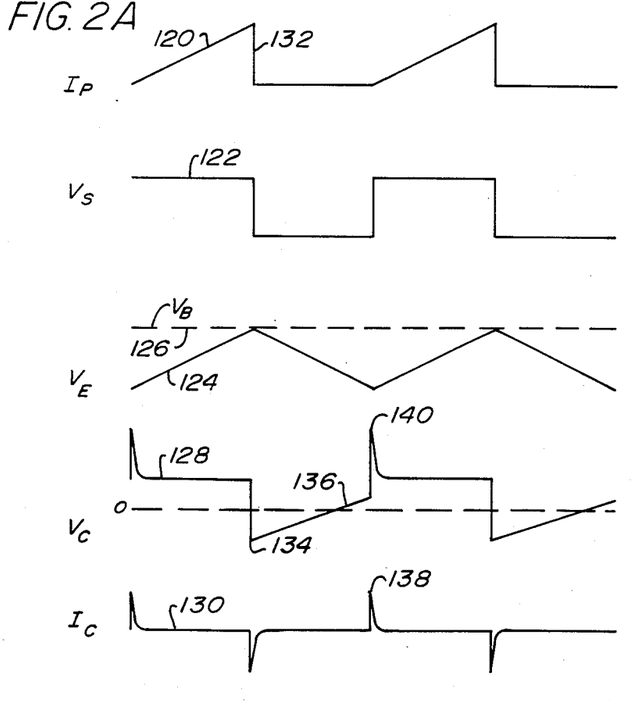
FIGS. 2A–C are a timing diagrams illustrating the operation of a portion of the circuit of FIG. 1.
Figure 2B:
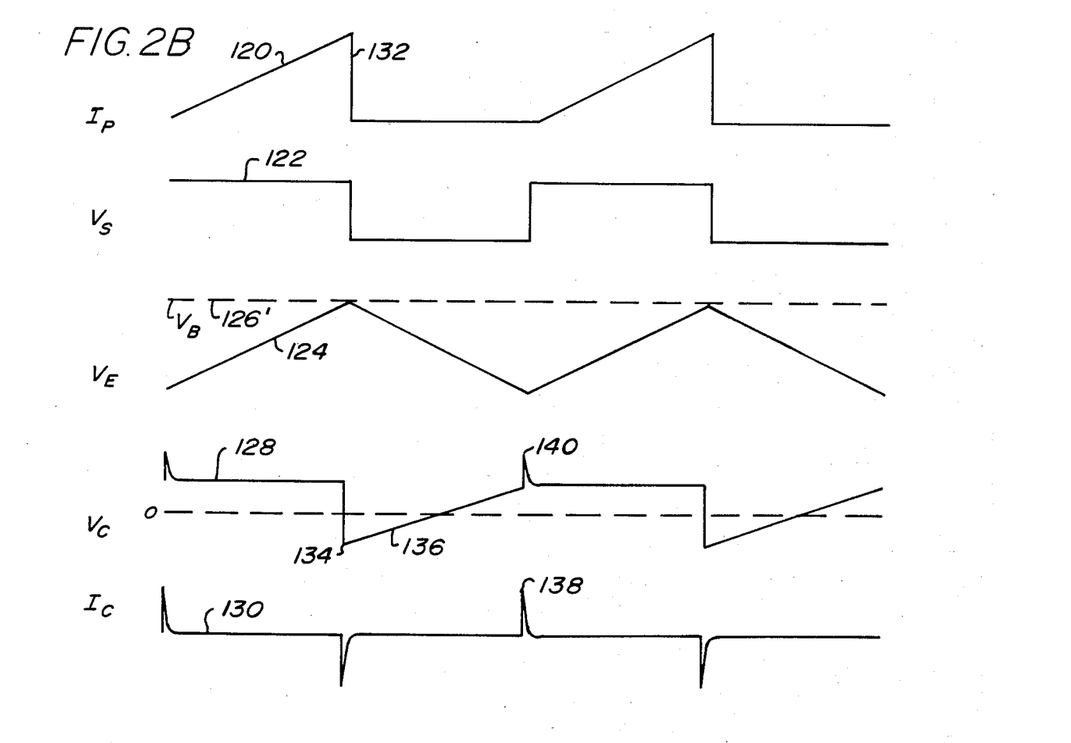
Figure 2C:
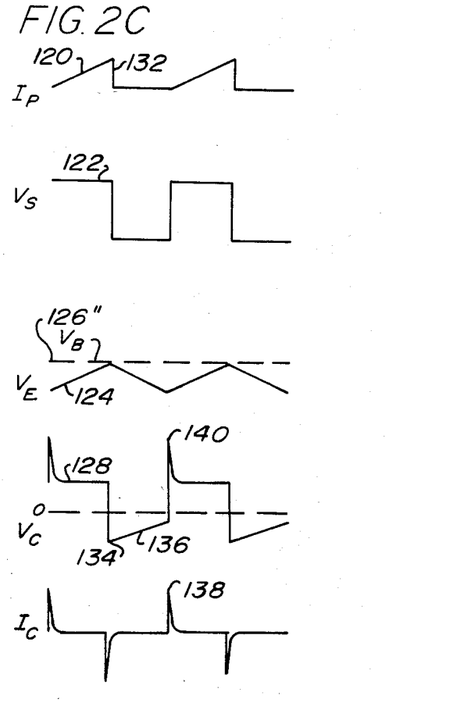

Referring further to FIGS. 2A–2C, there is shown representative waveforms useful in describing the operation of electrical switch means 44 and pulse-width modulating means 78.

Beginning at the start of the drive cycle, with current switch 24 turned on, a generally linearly increasing primary current, $I_p$, exemplarily illustrated at 120, is developed in primary winding 26 as hereinabove described. The slope of this current is directly proportional to the present voltage of source 12.

The primary current, $I_p$, develops a generally constant opposing voltage in primary winding 26 which is magnetically coupled to secondary windings 28 and 30. The polarity relationship of the voltage between the primary winding 26 and the secondary windings 28 and 30 is shown by the well known dot convention. The voltage, $V_s$, at the node between secondary winding 30, the cathode of diode 70 and inductor 80 is exemplarily illustrated at 122. The voltage $V_s$ develops a current through inductor 80 and resistor 82. This current is proportional to the integral of the voltage $V_s$, and linearly increases during the drive cycle developing a ramp voltage, $V_E$, exemplarily shown at 124, at the emitter of Q3. When this ramp voltage crosses the base drive voltage, $V_B$, exemplarily shown at 126, of transistor Q3, transistor Q3 turns on and applies a feedback pulse to the base of transistor Q1. The base voltage, $V_B$, of transistor Q3 is the weighted average of the error voltage and the output of rectifier means 50 and is exemplarily shown at 126. As mentioned above, the feedback pulse generated by transister Q3 causes transistor Q1 to saturate, shorting the drive current and base of current switch 24 to ground to turn off current switch 24, to thereby begin the flyback cycle. During the interval of time when the primary current, $I_p$, is increasing as shown at 120, the voltage, $V_c$, of capacitor 58 at the anode of diode 108 is generally constant, as exemplarily shown at 128, and the current, $I_c$, through capacitor 58 is zero, as exemplarily shown at 130.

When current switch 24 turns off to begin the flyback cycle, the primary current through primary winding 26 loops through capacitor 100 and diode 102 of snubber circuit 98. Capacitor 100 is chosen so that the current through current switch 24 substantially falls instantaneously to zero, as shown at 132, to transfer maximum power to secondary windings 28 and 30. Tertiary winding 54 changes polarity forward biasing diode 107 and clamping the voltage of capacitor 58 to approximately −0.6 to −1.0 v, as shown at 134. Resistor 96 charges capacitor 58 during the flyback cycle as shown at 136. When the stored energy in secondary windings 28 and 30 has been delivered to rectifier means 48 and 50, respectively, diodes 60 and 70 reverse bias as the polarity of these windings reverses. Tertiary winding 54 also reverses polarity in response thereto to develop the short current pulse, exemplarily shown at 138, which turns on current switch 24 as hereinabove described. The voltage of capacitor 58 also has a short spike, shown at 140, during this polarity change to forward bias diode 108.

When the output of rectifier means 50 is well regulated, so shown in FIG. 2A, the error voltage of comparator 84 is low. Also shown are exemplary waveforms of the primary current, the voltage of secondary winding 30 and the ramp voltage at the emitter of transistor Q3 for heavy load conditions, in FIG. 2B, and for light load conditions, in FIG. 2C. During heavy loads, the output voltage of rectifier means 50 will be lowered because of the rapid discharging of capacitor 76. The error voltage developed by comparator 84 thus increases, increasing the base voltage, $V_B$, of transistor Q3, as illustrated at 126'. Thus, the ramp voltage takes longer to cross the base voltage allowing the primary current to increase in amplitude thereby storing a greater amount of energy in power transformer 22 before the start of the next flyback cycle.

Similarly, when the output voltage of rectifier means 50 is above its desired level such as during a very light load condition, the error voltage developed by comparator 84 decreases, lowering the base voltage of transistor Q3 as exemplarily illustrated at 126''. The time duration for the ramp voltage to cross the base voltage is decreased, thus the primary current is at a much smaller amplitude at the beginning of the flyback cycle, whereby the energy transferred by power transformer 22 is decreased.

Thus, it is seen that feedback pulse developing means 78 regulates the switching of current switch 24 as a function of the present output voltage. Also, since the slope of the primary current is dependent upon the present voltage of source 12, the level of the voltage of secondary winding 30 and the slope of the ramp voltage is similarly dependent upon the present voltage of source 12. For example, if the voltage of source 12 is increasing, the slope of the ramp voltage similarly increases, such that the base voltage threshold is crossed sooner to initiate the flyback cycle, thereby providing regulation as a function of the present voltage of source 12.

Figure 3:
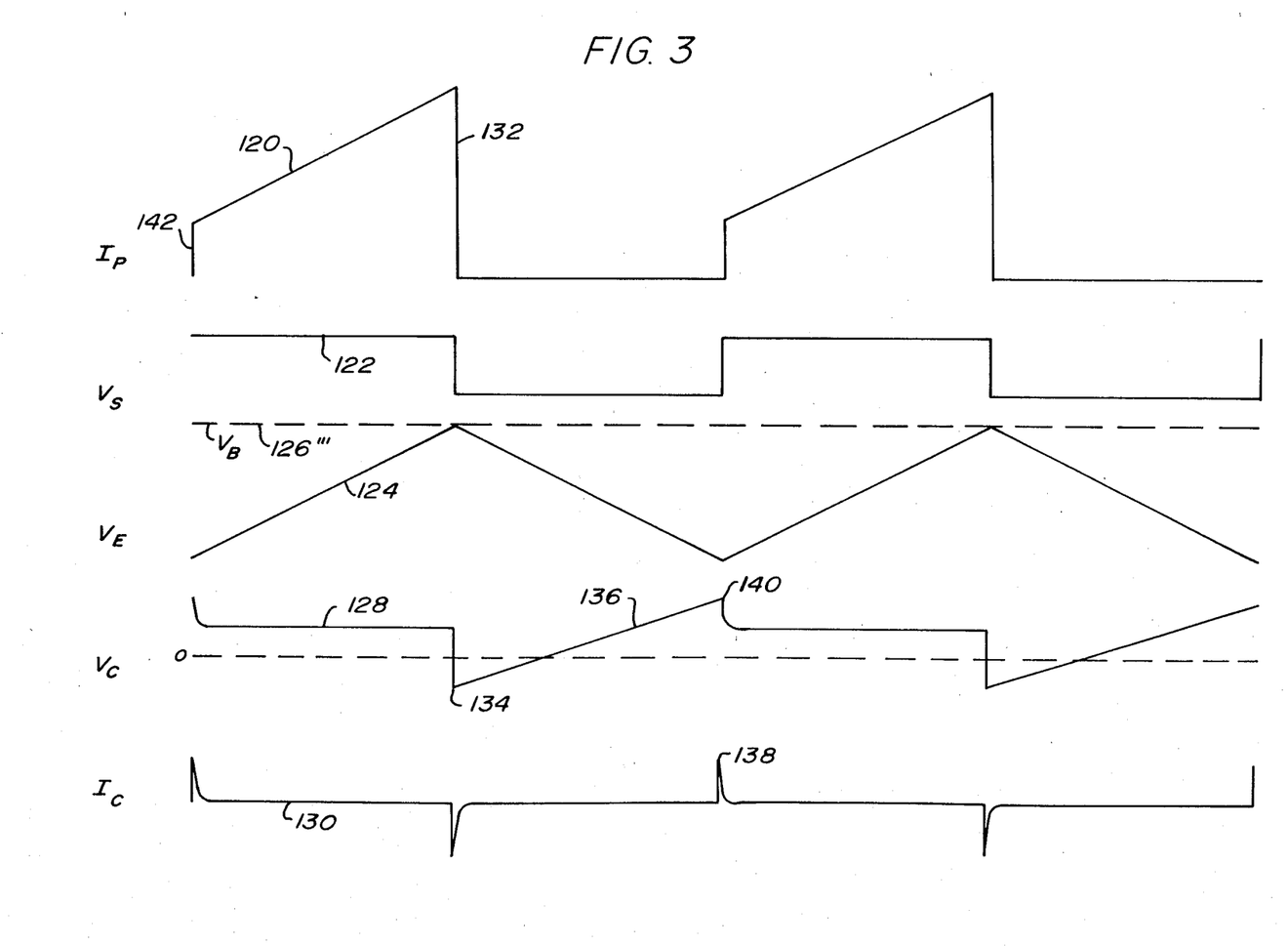
FIG. 3 is a timing diagram illustrating the operation of another portion of FIG. 1.

Referring now to FIG. 3, there is shown representative waveforms useful in describing the operation of the boost circuit means of resistor 96 and capacitor 52. During extremely heavy load conditions, diode 60 remains forward biased for a substantial period of time while secondary winding 28 or 30 is delivering its power to rectifier means 48 or 50. The voltage at the anode of diode 60 develops a current through resistor 96 which charges capacitor 52 as shown at 136. If capacitor 52 charges to a voltage, exemplarily shown at 140, sufficient to forward bias diode 108 and the base emitter junction of current switch 24 prior to the normal end of the flyback interval, it discharges a short current pulse, shown at 138. This pulse is applied to current switch 24, and causes switch 24 to turn on. A new drive cycle is initiated when current switch 24 turns on whereby the primary current, exemplarily illustrated at 120 (FIG. 3), is initially boosted to a level above zero as a result of the residual energy stored in power transformer 22, the boost level being shown at 142. The boosted primary current thus stores more energy during the boosted drive cycle. This increased energy is transferred to secondary winding 28 during the next successive flyback cycle. The drive cycle and the termination of the drive cycle is identical to the above description with reference to FIGS. 2A-2C.

Figure 4:
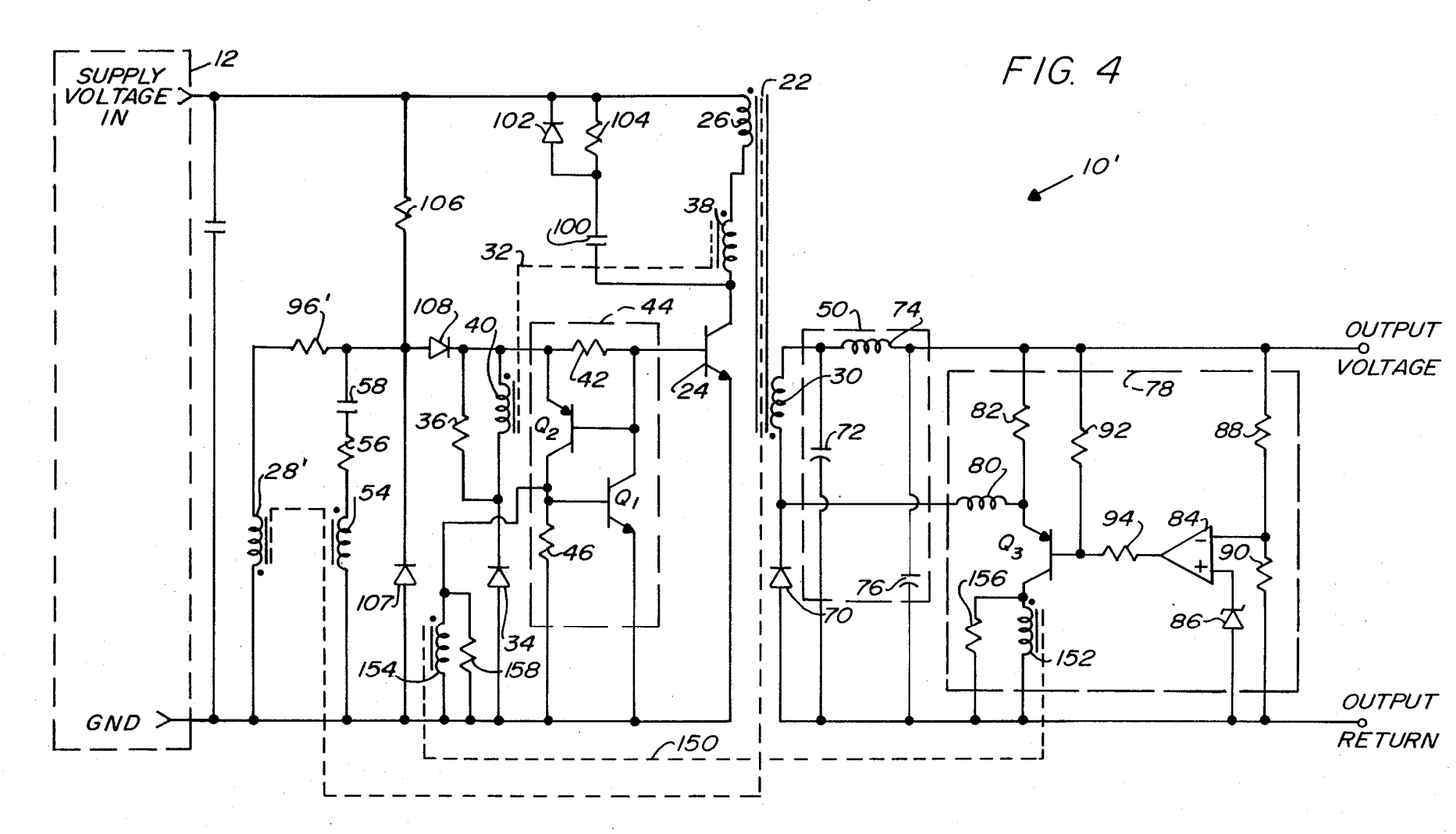
FIG. 4 is a schematic diagram of another embodiment of a current driven free running flyback power supply according to the present invention.

Referring now to FIG. 4, there is shown another embodiment of a flyback power supply 10' which provides DC isolation between secondary winding 30 and current switch 24. Where convenient, corresponding elements of FIG. 4 are designated by the same reference symbols of FIG. 1, these elements having been fully described with reference thereto.

Power supply 10' includes an isolation transformer 150 for isolating pulse-width modulating means 78 from electronic switching means 44. Isolation transformer 150 includes a first winding 152 serially connected between the collector of transistor Q3 and the output return line, and a second winding 154 connected in parallel with resistor 46. When transistor Q3 turns on, as hereinabove described, it applies a current to first winding 152 which develops a voltage in opposition to the current. This voltage is magnetically coupled to second winding 154 and is of sufficient amplitude to turn on transistor Q1. A pair of resistors 156 and 158 are connected in parallel with windings 152 and 154, respectively. Resistors 156 and 158 damp ringing of windings 152 and 154, respectively, when transistor Q3 turns off.

Isolation of the boost circuit means is accomplished by providing a feedback winding 28' on the primary winding 26 side of power transformer 20 and referenced to ground potential as shown by the dot convention. A resistor 96' may then be serially connected between the ungrounded side of feedback winding 28' and capacitor 58. During the flyback cycle, feedback winding 28', arranged to develop a positive voltage, causes a current to be developed through resistor 96' which charges capacitor 58. The voltage of feedback winding 28' and the value of resistor 96' is selected so that after a selected time, capacitor 58 develops the current pulse, illustrated in FIG. 3 at 138, to turn on current switch 24. Once the time constant of resistor 96' and capacitor 58 has been selected, resistor 98' may then be selected so that power supply 10' turns on at a selected start-up voltage as hereinabove described.

It is of course understood that although the preferred embodiments of the present invention have been illustrated and described, various modifications, alternatives and equivalents thereof will become apparent to those skilled in the art, and, accordingly, the scope of the present invention should be defined only by the appended claims and equivalents thereof.

What is claimed is:

1. A flyback power supply for developing an output DC voltage from a source of DC, said power supply comprising:

a power transformer including a primary winding and a secondary winding;

current switch means for periodically coupling a primary current during a first interval of time through said primary winding from said source, whereby energy is stored in said transformer during said first interval, said primary current having an increasing amplitude during each said interval;

means for developing a drive current whose amplitude is a function of said primary current and for coupling said drive current to said current switch means, said current switch means being responsive to said drive current for enabling said current switch means to remain on;

pulse-width modulation means for developing a feedback pulse at a point in time after said current switch means turns on as a function of the deviation of said output voltage from a predetermined voltage;

electrical switch means for turning off said current switch means in response to said feedback pulse, said energy stored in said transformer being transferred out through said secondary winding when said current switch means is off during a second interval of time;

means responsive to said energy transferred out through said secondary winding during each said second interval for developing said output DC voltage;

means for developing a first current pulse when all of said stored energy has been transferred out through said secondary winding, said first current pulse being applied to said current switch means to initiate coupling of said primary current through said primary winding, said current pulse developing means including a feedback winding of said power transformer and a capacitor in series with said feedback winding, said feedback winding applying a voltage to said capacitor when said stored energy has been transferred out through said secondary winding to charge said capacitor, said capacitor emitting said current pulse while being charged by said voltage; and a first resistor coupled between said secondary winding and said capacitor for charging said capacitor during said second interval of time, said current pulse developing means developing a second current pulse for application to said current switch means at a selected point during said second interval when said capacitor has been charged to a voltage sufficient to turn on said current switch means.

2. A flyback power supply for developing an output DC voltage from a source of DC, said power supply comprising:

a power transformer including a primary winding and a secondary winding;

current switch means for periodically coupling a primary current during the first interval of time through said primary winding from said source, whereby energy is stored in said transformer during said first interval, said primary current having an increasing amplitude during each said interval;

means for developing a drive current whose amplitude is a function of said primary current and for coupling said drive current to said current switch means, said current switch means being responsive to said drive current for enabling said current switch means to remain on;

pulse-width modulating means for developing a feedback pulse at a point in time after said current switch means turns on as a function of the deviation of said output voltage from a predetermined voltage;

electrical switch means for turning off said current switch means in response to said feedback pulse, said energy stored in said transformer being transferred out through said secondary winding when said current switch means is off during a second interval of time;

means responsive to said energy transferred out through said secondary winding during each said second interval for developing said output DC voltage;

means for developing a first current pulse when all of said stored energy has been transferred out through said secondary winding, said first current pulse being applied to said current switch means to initiate coupling of said primary current through said primary winding, said current pulse developing means including a feedback winding of said power transformer and a capacitor in series with said feedback winding, said feedback winding applying a voltage to said capacitor when said stored energy has been transferred out through said secondary winding to charge said capacitor, said capacitor emitting said current pulse while being charged by said voltage;

a first resistor coupled between said secondary winding and said capacitor for charging said capacitor during said second interval of time, said current pulse developing means developing a second current pulse for application to said current switch means at a selected point in time during said second interval when said capacitor has been charged to a voltage sufficient to turn on said current switch means; and a second resister coupled between said source and said first resistor, said first resistor being effectively grounded at initial power up of said power supply, said second resistor being selected so that at a selected voltage of said source during power off, a voltage between said first resistor and said second resistor is sufficient to turn on said current switch means.

3. A flyback power supply for developing an output DC voltage from a source of DC, said power supply comprising:

a power transformer including a primary winding and a secondary winding;

current switch means for periodically coupling a primary current during a first interval of time through said primary winding from said source, whereby energy is stored in said transformer during said first interval, said primary current having an increasing amplitude during each said interval;

means for developing a drive current whose amplitude is a function of said primary current and for coupling said drive current to said current switch means, said current switch means being responsive to said drive current for enabling said current switch means to remain on;

pulse-width modulation means for developing a feedback pulse at a point in time after said current switch means turns on as a function of the deviation of said output voltage from a predetermined voltage;

electrical switch means for turning off said current switch means in response to said feedback pulse, said energy stored in said transformer being transferred out through said secondary-winding when said current switch means is off during a second interval of time;

means responsive to said energy transferred out through said secondary winding during each said second interval for developing said output DC voltage;

means for developing a first current pulse when all of said stored energy has been transferred out through said secondary winding, said first current pulse being applied to said current switch means to initiate coupling of said primary current through said primary winding, said current pulse developing means including a feedback winding of said power transformer and a capacitor in series with said feedback winding, said feedback winding applying a voltage to said capacitor when said stored energy has been transferred out through said secondary winding to charge said capacitor, said capacitor emitting said current pulse while being charged by said voltage; and means responsive to voltage changes of said feedback winding for developing a second output voltage.

4. A flyback power supply for developing an output DC voltage from a source of DC, said power supply comprising:

a power transformer including a primary winding and a secondary winding;

current switch means for periodically coupling a primary current during the first interval of time through said primary winding from said source, whereby energy is stored in said transformer during said first interval, said primary current having an increasing amplitude during each said interval;

means for developing a drive current whose amplitude is a function of said primary current and for coupling said drive current to said current switch means, said current switch means being responsive to said drive current for enabling said current switch means to remain on;

pulse width modulating means for developing a feedback pulse at a point in time after said current switch means turns on as a function of the deviation of said output voltage from a predetermined voltage;

electrical switch means for turning off said current switch means in response to said feedback pulse, said energy stored in said transformer being transferred out through said secondary winding when said current switch means is off during a second interval of time;

means responsive to said energy transferred out through said secondary winding during each said second interval for developing said output DC voltage;

means for developing a first current pulse when all of said stored energy has been transferred out through said secondary winding, said first current pulse being applied to said current switch means to initiate coupling of said primary current through said primary winding; and means for developing a second current pulse at a selected point in time during said second interval of time, said second current pulse being applied to said current switch means to initiate coupling of said primary current through said primary winding prior to all of said stored energy being transferred out through said secondary winding.

5. The power supply of claim 4 wherein said second current pulse developing means includes a capacitor and a resistor coupled between said secondary winding and said capacitor, the voltage of said secondary winding developing a current through said resistor to charge said capacitor during said second interval of time, said capacitor emitting said second current pulse when its voltage is sufficient to turn on said current switch means.

6. The power supply of claim 4 wherein said second current pulse developing means includes a feedback winding of said power transformer, a capacitor and a resistor coupled in series between said feedback winding and said capacitor, the voltage of said feedback winding developing a current through said resistor to charge said capacitor during said second interval of time, said capacitor discharging said second current pulse when its voltage is sufficient to turn on said current switch means.

7. A flyback power supply for developing an output DC voltage from a source of DC having an output line and a return line, said power supply comprising:

a power transformer including a primary winding and a secondary winding;

a current switch including a transistor having a base, a collector and an emitter coupled to said return line, said current switch periodically coupling a primary current through said primary winding from said output line of said source to said collector during a first time interval when said current switch is on, said primary current having an increasing amplitude during each said interval;

a current transformer having a first winding and a second winding, said primary current being coupled through said first winding, said second winding developing a drive current whose amplitude is a function of said primary current, said second winding coupling said drive current to said base whereby said drive current increases proportionally with said primary current to enable said current switch to remain on;

pulse-width modulation means for developing a feedback pulse at a point in time after said current switch means turns on as a function of the deviation of said output voltage from a predetermined voltage;

electrical switch means for turning off said current switch means in response to said feedback pulse, said energy stored in said transformer being transferred out through said secondary winding when said current switch means is off during a second interval of time;

means responsive to said energy transferred out through said secondary winding for developing said output DC voltage; and means for developing a current pulse at a selected point in time during said second interval of time, said current pulse being applied to said current switch to initiate coupling of said primary current through said primary winding prior to all of said stored energy being transferred out through said secondary winding, said current pulse developing means including a capacitor and a resistor coupled between said secondary winding and said capacitor, the voltage of said secondary winding developing a current through said resistor to charge said capacitor during said second interval of time, said capacitor emitting said current pulse when its voltage is sufficient to turn on said current switch.

* * * * *